United States Patent [19]

Wieder

[11] 4,081,684

[45] Mar. 28, 1978

[54] COMBUSTION PRODUCT DETECTOR

[76] Inventor: Horst K. Wieder, 1207 Riverview La., Watertown, Wis. 53094

[21] Appl. No.: 592,028

[22] Filed: Jun. 30, 1975

Related U.S. Application Data

[63] Continuation-in-part of Ser. No. 485,120, Jul. 2, 1974, Pat. No. 3,892,930.

[51] Int. Cl.[2] .......................... G01T 1/18; H01J 39/28

[52] U.S. Cl. .................................... 250/381; 250/252; 340/237 S

[58] Field of Search ............... 250/252, 381, 385, 493, 250/496; 340/237 S

[56] References Cited

U.S. PATENT DOCUMENTS

| | | | |
|---|---|---|---|
| 2,870,341 | 1/1959 | Pennock | 250/493 |
| 3,767,917 | 10/1973 | Lampart et al. | 250/385 X |
| 3,866,195 | 2/1975 | Ried, Jr. | 250/381 X |

*Primary Examiner*—Archie R. Borchelt
*Attorney, Agent, or Firm*—John M. Diehl

[57] ABSTRACT

A combustion product detector contains a single ionization chamber having a radioactive source therein. It is provided with means to test the function of the device. The means includes an electrically non-conductive member which may be introduced in the ionization chamber to simulate (in effect) the presence of smoke in the chamber. Housing for the chamber is constructed and mounted to shield the components contained therein. An FET and resistors are closely coupled to a radioactive source holder and to a printed circuit board on which the housing is mounted. A metal coil spring electrically connects the non-conductive test member and the housing to discharge static. The test member may be removed readily to permit inspection and cleaning of the radioactive source surface. The device may be powered from a battery or from AC line current with or without a standby battery to automatically power the device in the event of line current failure and may be provided with a circuit to produce a signal in the event of power failure.

13 Claims, 8 Drawing Figures

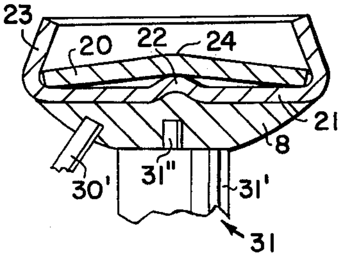
Fig. 3.
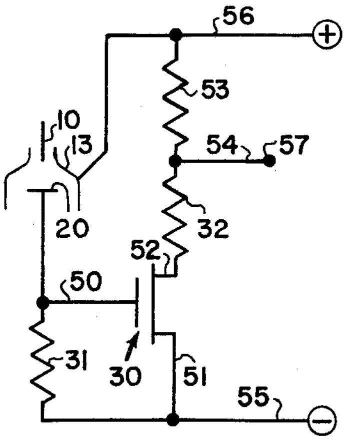
Fig. 4.
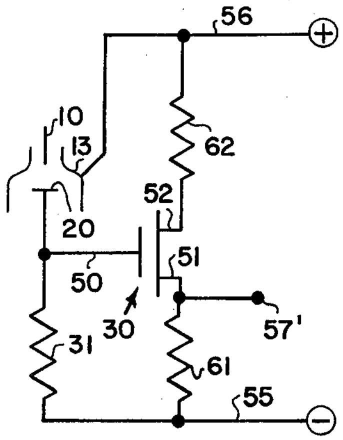
Fig. 5.
Fig. 6.
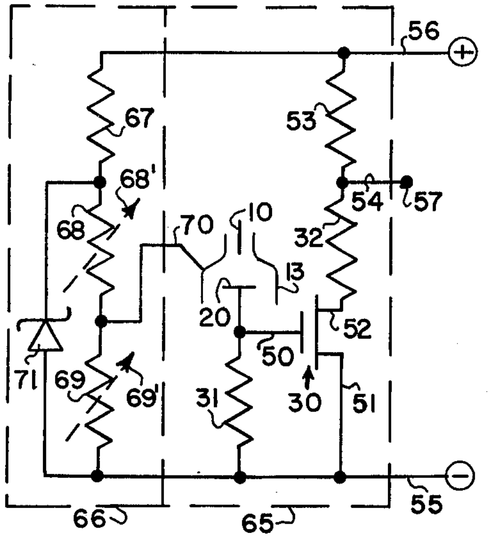
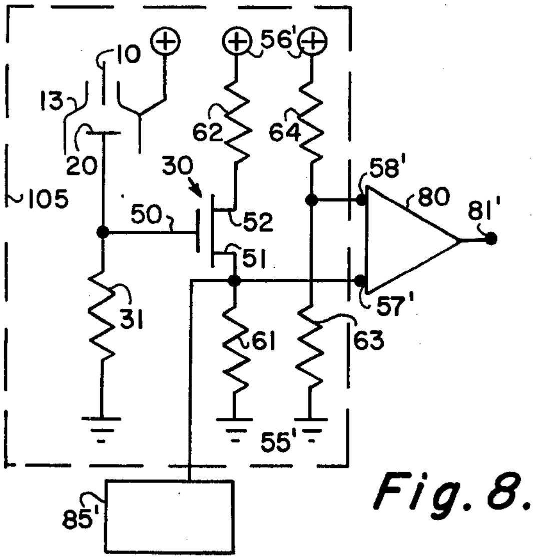
Fig. 8.
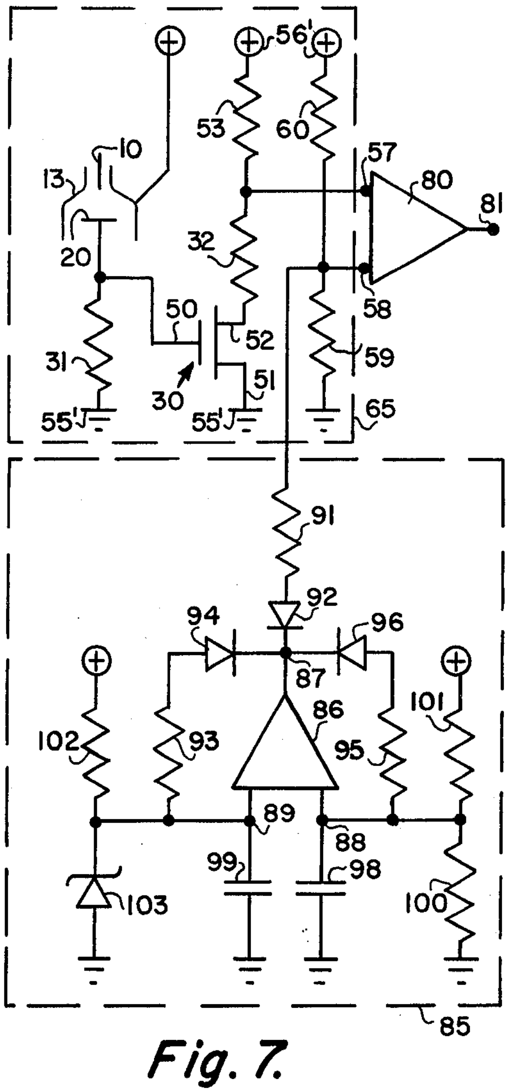
Fig. 7.

COMBUSTION PRODUCT DETECTOR

CROSS-REFERENCES

This application is a continuation-in-part of application Ser. No. 485,120, filed July 2, 1974, entitled LOUDSPEAKER ENCLOSURE now U.S. Pat. No. 3,892,930.

FIELD

This invention relates to a combustion product detector or ionization smoke detector to provide a voltage change in a circuit in response to the presence of combustion products in a portion of the device. The voltage change may be utilized to provide an audible or visual alarm signal.

SUMMARY

Devices which have been heretofore described for detecting smoke or other combustion products and emitting an alarm signal in response to the presence thereof, wherein an ionization chamber has been provided and a radioactive source has been provided in the ionization chamber to ionize the gas in the chamber, have generally been of two types: those in which two chambers are provided, smoke and other combustion products being admitted only to one chamber and the other chamber serving as a reference for the first chamber, and those in which only one chamber is provided. The present device is of the type wherein only one chamber is provided.

Patents in which two chambers are provided which are believed to have little pertinence to the present invention include U.S. Pat. Nos. 3,056,123, 3,714,433, 3,718,919, 3,295,121, 3,688,119, 3,500,368, 2,981,840, 2,408,051 and 3,702,468.

U.S. Pats. Nos. 2,994,768 and 3,271,756 describe ionization detectors wherein a single ionization chamber is utilized but unlike the present invention, the ionization chamber is asymmetric and the asymmetry of the chamber is critical to the invention.

U.S. Pats. Nos. 3,353,170, 3,676,678 and 3,778,800 disclose combustion product detection devices of the ionization type wherein only a single ionization chamber is provided. U.S. Pat. No. 3,353,170 relates to an improved radioactive source material and discloses none of the important or critical features of the present invention. U.S. Pat. No. 3,676,678 provides an FET (field effect transistor) having its gate connected with the source electrode of the ionization chamber, as is the case in the disclosure of U.S. Pat. No. 3,778,800 and neither of these patents disclose any of the subject matter of the present invention. U.S. Pat. Nos. 3,714,433, 3,718,919, 3,702,468, 3,688,119 show the gate of an FET connected between electrodes of two ionization chambers, one being open and the other being closed to provide a reference. U.S. Pat. No. 3,676,678 provides a high impedance FET and the leakage impedance of the FET between its gate and drain electrodes is utilized in place of a reference ionization chamber.

In the prior art described in U.S. Pat. No. 3,676,678, the gate of the FET is connected between the target electrode of an open ionization chamber and the source electrode of a closed ionization chamber as is the case in U.S. Pat. No. 3,702,468 whereas in U.S. Pat. No. 3,178,919 the gate of the FET is connected to the junction of the source electrode of the open ionization chamber and the target electrode of the closed ionization chamber and in each of U.S. Pats. No. 3,688,119, 3,714,433 and 3,500,368, the gate of the FET is connected to the junction between the source electrodes of both ionizaton chambers and in U.S. Pat. No. 3,778,800 the gate of the FET is connected to the source electrode of the ionization chamber.

Whereas in the present invention the mode of connecting the FET to the single ionization chamber provided is not claimed, it may be merely noted that the gate of the FET of the present device is connected to the target electrode of the single ionization chamber.

Patents having two ionization chambers with which an FET is utilized include U.S. Pat. Nos. 3,500,368, 3,688,119, 3,702,468, 3,714,433 and 3,718,919.

U.S. Pat. No. 3,778,800 describes a combustion product detector having a single ionization chamber but relates primarily to providing means to indicate when the energy level of the battery is reduced to a predetermined level.

None of the aforementioned patents shows, suggests or teaches the present invention or any portion of the present invention. U.S. Pat. Nos. 3,702,468 and 3,778,800 describe means to ascertain low battery energy level or battery failure and hereinbelow means are described in conjunction with the present invention to ascertain low battery energy level, battery failure, battery short and absence of battery but the means provided herein are different than those described in said patents.

SUMMARY

To provide a target electrode for the ionization chamber of the combustion product detector of the invention, a flat blank may first be blanked out of a suitable conductive material such as beryllium-copper or the like, the blank being provided with petal-likeradially extending portions. The blank may then be formed as by drawing or stamping into a domelike member which may then be attached to a printed circuit board. Mounted on the printed circuit board within the chamber thus provided are a radioactive source, an FET and two resistors as hereinbelow described. Apertures to admit smoke and other combustion products to the ionization chamber are provided by the spaces between the petal-like portions after stamping. The target electrode is connected to a layer of conductive material on the PC (printed circuit) board so that the sensitive parts inside the chamber, namely the radio-active source, the FET, the two resistors and the leads for these parts are effectively shielded. A plastic test member is admitted into a central aperture in the target electrode so that manually depressing it by pushing one end of the member which serves as a test button forces the test member into the chamber against the biasing action of a spring. A portion of the member thus inserted into the chamber impedes the flow of ionization current from the radioactive source to the target electrode and in this manner it can be ascertained by operation off the test button whether the device will function properly to sound an alarm if smoke or other combustion products are admitted to the chamber. The test member is most suitably received in an aperture in the target electrode. The aperture may be centered above the radioactive source and the test member is preferably mounted between laterally extending resilient fingers so that by withdrawing it laterally from the mounting fingers it may be readily removed to expose the source for inspection and cleaning.

Thus, if it is necessary to depress the button a relatively great distance in order to obtain an alarm signal it may be assumed that the device needs no further attention. Whereas if it is necessary to depress the button only a short distance to obtain an alarm signal, it may be assumed that the device could not be relied upon for a long period without further attention. Such attention may include inspection of the radioctive source, cleaning of the radioactive source, checking and replacement if necessary of the battery and the like. The radioactive source is retained in a holder in such manner that the security of its retention may readily be checked.

The FET is preferably of high impedance and accordingly it is preferably arranged with respect to the radioactive source and with respect to the two resistors closely located to the FET and to the radioactive source with very short leads and with maximum shielding being disposed within the ionization chamber itself.

The device may optionally be powered either with AC line current or with a battery and if powered with AC current may be provided with a standby battery and with automatic switching to the standby battery in the event of AC current failure.

The device may also be optionally provided with a circuit which responds to impairment of the power supply such as low battery voltage, battery short, absence of battery, AC current failure and the like by actuating the same alarm device as may be actuated by the detection of combustion products. An oscillator is preferably part of the circuit to provide a repeating signal as contrasted with the steady alarm signal provided in response to the presence of combustion products and the value of the elements in the circuit may be selected to preselect the intervals between the repetitive signals. The device is arranged to provide such a repetitive signal for at least a week.

Also, a pilot light may be provided to provide a visual signal when the device is on and the AC line current voltage is above a preselected value. Such a light is preferably provided as an LED supplied through a diode.

Furthermore, preferred embodiments are provided with a sensitivity control circuit whereby the sensitivity of the ionization chamber may be readily adjusted to suit various service conditions and whereby the effect of drift in circuit parameters and drift in component values associated with the ionization chamber and detector circuitry are effectively mitigated.

OBJECTS

It is therefore an object of the invention to provide an improved combustion products detector of the type utilizing a single radioactive source in a single ionization chamber.

It is a further object to provide such a device wherein its functionality may be tested without changing any electrical value or parameter in the circuitry associated therewith.

It is a further object to provide such a device wherein operation of the test means indicates readily and without extra operations an approximation of the extent to which the battery has been discharged, the radioactive source effectiveness impaired, or operation otherwise impaired to indicate whether or not nonfunctionality is imminent.

Another object is such a device wherein the test means may be readily and easily removed for the purpose of exposing the radioactive source for inspection and cleaning.

Another object is such a device having an FET and resistors associated with the radioactive source wherein the elements associated with the radioactive source are so arranged that their leads are extremely short and they are exposed within the shield provided by the ionization chamber in order to minimize drift and the effect of outside influences.

Another object is such a device wherein the sensitivity of the device may readily be adjusted to a desired value and may then be maintained at such value with minimum drift.

Further objects will become apparent from the drawings and from the following detailed description.

DRAWINGS

In the drawings like reference numerals refer to like parts and;

FIG. 3 is an enlarged fragmentary cross-sectional of a portion of the embodiment of FIG. 2;

FIG. 4 is a schematic circuit diagram of the detector portion of one embodiment of the device of the invention;

FIG. 5 is a schematic circuit diagram of the detector portion of another embodiment;

FIG. 6 is a schematic circuit diagram of a modification of the embodiment of FIG. 4;

FIG. 7 is a schematic circuit diagram of the embodiment of FIG. 4 provided with a power supply malfunction detector and oscillator; and FIG. 8 is a schematic circuit diagram of the embodiment of FIG. 5 provided with the oscillator detector circuit of FIG. 7.

DESCRIPTION

Figure 1:
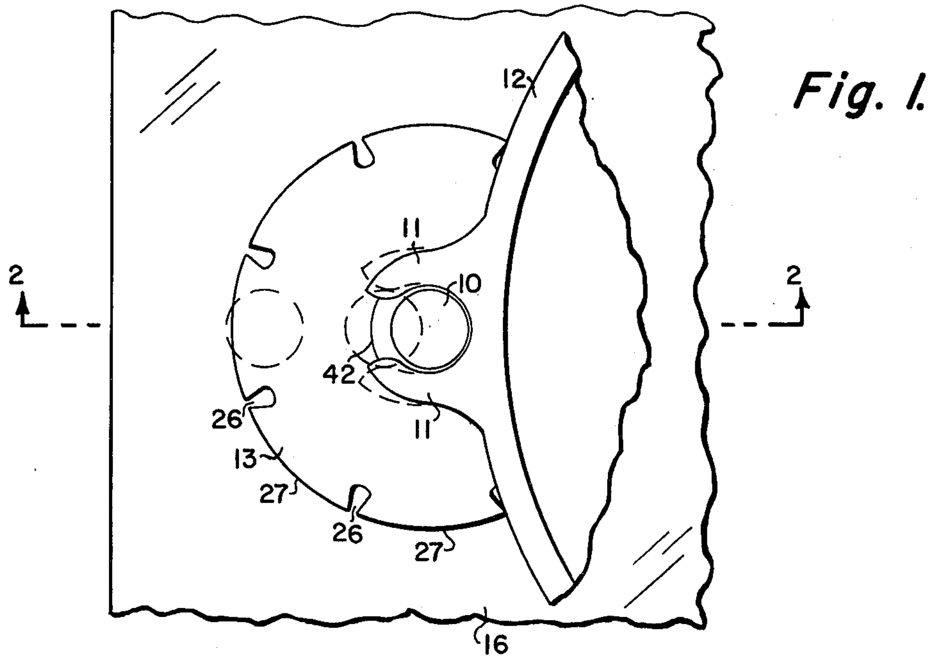
FIG. 1 is a fragmentary plan view of a portion of the device.
Figure 2:
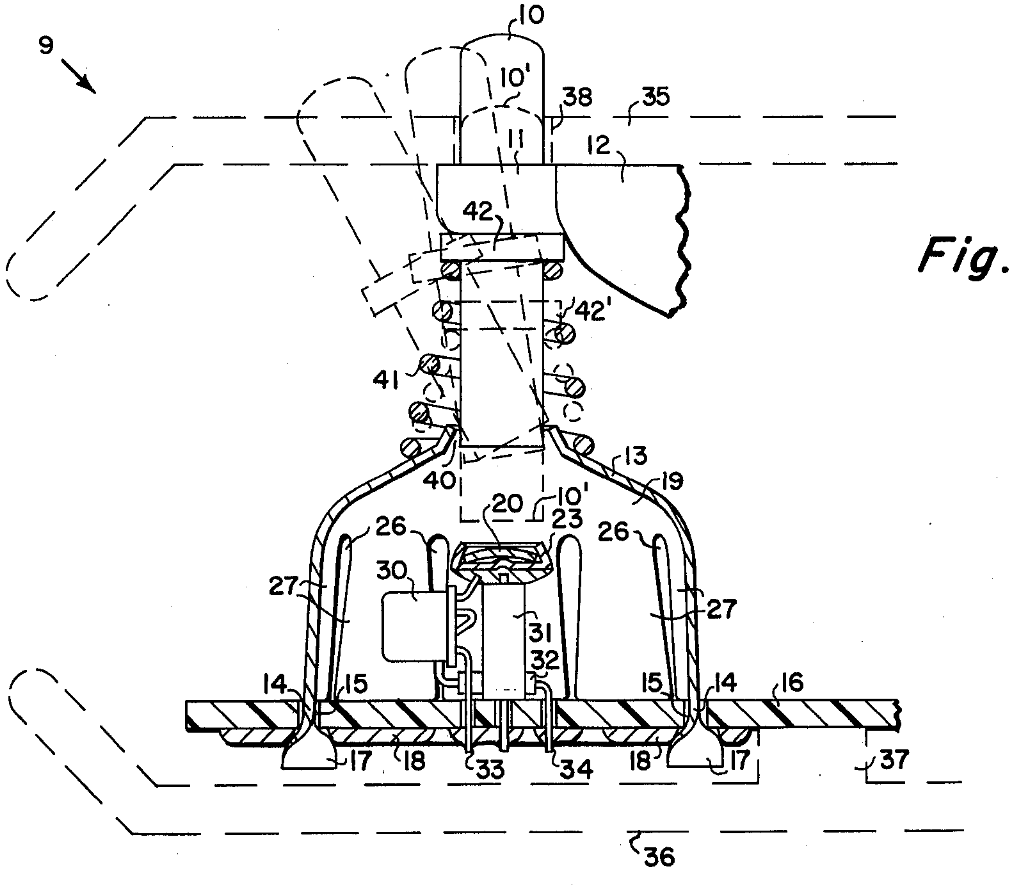
FIG. 2 is a partially schematic partially cross-sectional view taken on lines 2—2 in FIG. 1.

Referring now to FIGS. 1, 2 and 3 there is shown a test buttom or member 10 which may be described as a longitudinally extending member of plastic (polymeric synthetic resinous) material received between resilient fingers 11 which may be of similar material extending from portion 12 of a part (speaker bracket and horn) of device 9 which is described fully in co-pending patent application Ser. No. 485,120, filed July 2, 1974, entitled LOUDSPEAKER ENCLOSURE which may serve to provide means to support fingers 11. Member 10 may be of any suitable electrically nonconductive material ; thus it may be of ceramic instead of plastic. Fingers 11 may be of any material and construction suitable to provide such resiliency as may permit removal of member 10 laterally; thus they may be made of metal spring stock.

Housing member 13 is made of an electrically conductive material, e.g., a metal such as copper or beryllium-copper and may be provided with legs 14 which extend through holes 15 in printed circuit board 16. Legs 14 may be twisted or bent at 17 to retain member 13 in place with respect to printed circuit board 16 and to contact conductive layer 18 on the underside of board 16 so that conductive layer 18 and member 13 define an electrically shielded chamber or space 19. Exposed within space 19 is a radioactive member 20 disposed to emit gamma or beta or alpha rays either by virtue of comprising radioactive material or having a coating of radioactive material provided on its upper surface. A suitable radioactive material is one which emits primarily alpha waves such as Radium 226 or Americium 241. Member 20 may be retained in member 21 which may be first blanked out as a flat disk and then stamped or drawn to provide upwardly extending edge or wall 23; alternatively member 21 may be blanked and stamped in one operation to provide upwardly extending edge or wall 23. Disk or plate 20 may then be dropped into place and wall 23 may then be rolled or otherwise formed inwardly as shown to retain disk 20 in place. Member 21 may be provided with a simple 22 in the bottom which, when wall 23 is rolled inwardly, produces dimple 24 in plate 20 if the grasp of member 20 by wall 23 of member 21 is satisfactory. Field effect transistor (FET) 30, resistor 31 and resistor 32 which are shown schematically in FIGS. 3 to 7 are located as close as possible to member 21 and to printed circuit board 16 so that their leads are as short as possible because of the high impedance that the leads have in the circuit. The leads which extend through the board are soldered respectively as shown at 33 and 34. The leads 30′ and 31″ from FET 30 and resistor 31 respectively may be soldered with solder 8 to member 21 as shown, being kept as short as possible and solder 8 may extend from member 21 to body 31′ of resistor 31. Member 13 is provided with an aperture 40 in which is received the bottom end of member 10.

Member 13 is preferably stamped or drawn from a flat blank and, of course, in order to provide aperture 40, a disk if stamped therefrom. The disk stamped out to provide aperture 40 may suitably be used to provide member 21 which may then be formed to provide walls 23 which may subsequently be rolled inwardly to grasp member 20.

Member 10 may be biased upwardly by metal compression spring 41 acting between the outer surface of member 13 and extending portion 42 on member 10 provided as a stop for spring 41. Member 13 is provided with apertures 26 through which smoke or other combustion products to be detected by the device may enter chamber 19. Apertures 26 are defined by leaf or petal portions 27 of member 13 which may be provided as outwardly extending flat members in the blank from which member 13 may be stamped or drawn.

The device may be enclosed within a housing having a top member 35 and a bottom member 36 which for simplicity are not shown but which are indicated schematically in dashed lines and the printed circuit board may be supported from housing member 36 by projecting portions such as portion 37 not shown for simplicity but indicated in dashed lines.

In order to make a test to determine whether the device is in working order and will respond appropriately to the presence of smoke or other combustion products within member 13, member 10 which extends outwardly through an aperture 38 in wall or housing member 35 may be depressed to the position shown in dashed lines at 10′, spring 40 then being compressed so that portion 42 occupies the position shown in dashed lines at 42′. Not only the functioning of the device may be checked by operation of member 10 but also the degree to which the device may have approached toward a non-functioning state may be checked by observing the distance to which it is necessary to depress member 10 in order to obtain a signal. The extent to which member 10 must be depressed is roughly inversely proportional to the amount of dirt accumulated on source 20 and if it is necessary to depress member 10 only a short distance to obtain a signal, a relatively large amount of dirt may be expected to have accumulated on the radioactive source or excessive drift, degradation and/or incipient failure of some other component may be indicated. When it is desired to remove test button 10, housing 35 is first removed and member 10 is then moved to the position shown in dashed lines at 10″ whereupon fingers 11 move to the position shown in dashed lines at 10″ whereupon fingers 11 move to the position shown in dashed lines at 11′ by reason of their resilience, being of plastic synthetic polymeric or other resilient material. Member 10 may then be moved to the position shown in dashed lines at 10‴ and may be then withdrawn directly outwardly from aperture 40.

Thereupon member 20 may be inspected by visual observation through aperture 40 to ascertain whether it needs cleaning and, if so, any suitable device such as a cotton-tipped stick may be inserted through aperture 40 to clean the surface of member 20 by wiping or swabbing action of the cotton-tip applied to the surface of member 20.

Referring now to FIG. 4, it may be seen that radioactive source 20 is connected to gate 50 of FET 30 and is connected through resistor 31 to conductor 55. Target electrode 13 is connected to conductor 56. Drain 51 of FET 30 is connected to conductor 55 and source 52 of FET 30 is connected through resistors 32 and 53 to conductor 56. Connected to the junction between resistors 32 and 53 may be provided conductor 54 to supply an output signal at terminal 57 which may be amplified by an amplifier not shown to drive a bell, buzzer, whistle or lamp or any other audible or visual alarm device located either within the device or remotely therefrom to thereby provide an alarm in response to the presence of smoke or other combustion products in the ionization chamber or to the operation of test member 10.

Referring now to FIG. 5, source 51 and drain 52 of FET 30 may be connected respectively through resistors 61 and 62 to conductors 55 and 56 and since the output signal of FET 30 is available from the source-drain circuit rather than merely from the source, the output signal may be fed to amplifier terminal 57′ from drain 51 as shown instead of from source 52 as in FIG. 3.

Referring now to FIG. 6, the detector circuit embodiment of FIG. 4 is indicated within dashed lines 65 and it may be provided with a sensitivity control circuit indicated within dashed lines 66.

Within sensitivity control circuit 66, resistor 67 limits the current flow, resistors 68 and 69 provide a voltage divider having conductor 70 attached to the junction therebetween instead of to conductor 56 and Zener diode 71 regultes the voltage across resistors 68 and 69. Either or both of resistors 68 or 69 can be adjustable as indicated by dashed arrows 68′ and 69′. By suitable adjustment of the values of one or both or resistors 68 and 69 the voltage across the ionization chamber can be set so that the sensitivity of the ionization chamber is selected both accurately and predictably regardless of B+ voltage variations because of the regulating effect of Zener diode 71. The effect of drift in B+ voltage, drift stemming from accumulation of dust and dirt, and drift due to component value-change with age are all thus minimized.

Circuit 66 may also be utilized in conjunction with the detector circuit of FIG. 5.

Referring now to FIG. 7, the detector circuit 65 of FIG. 4 is shown in dashed lines, terminal 57 being a terminal of amplifier 80 which may provide an amplified output signal at terminal 81 which may be utilized to drive such alarm devices as hereinbefore described. Another terminal 58 for amplifier 80 may be supplied and connected with conductors 55 and 56 through resistors 59 and 60. Power supply malfunction unit 85 which may also be referred to as a low voltage detector/oscillator or power malfunction detection and response unit is indicated in dashed lines.

It is both a detector which responds to power supply voltage below a selected value or absence of power supply voltage and is an oscillator which oscillates to provide a signal in response to positive detection which is supplied to amplifier 80 and amplified thereby to provide a signal at terminal 81 which is preferably readily distinguishable from the signal provided by unit 65 in response to the presence of combustion products in housing 13 and also preferably which at least roughly indicates the extent of the impairment of the power supply.

Terminal 58 of amplifier 80 is connected through resistor 91 and diode 92 to terminal 87 of amplifier 86 and which is connected respectively through diode 94 and resistor 93 with terminal 89 and through diode 96 and resistor 95 with terminal 88 of amplifier 86. In place of indicating conductors 55 and 56 as such, connections to B+ voltage are indicated as at 56' and connections to ground are indicated as at 55'. Terminals 88 and 89 are also respectively connected to ground through condensers 98 and 99. One of these condensers may be omitted. Terminal 88 is further connected to the junction of resistors 100 and 101 respectively connected to ground and B+ and terminal 89 is connected to B+ through resistor 102 and to ground through Zener diode 103.

The values of the components of circuit 85 are selected to provide a repetitive signal at terminal 81 to provide intermittent operation of the alarm device. In preferred embodiments, the repetitive signal is generated for at least a week, despite the impairment of the power supply.

Referring now to FIG. 8, the embodiment of FIG. 5 is indicated in dashed lines at 105 and amplifier 80 is provided to provide an amplified signal at terminal 81'. Terminal 58' of the amplifier may be supplied from the junction of resistors 63 and 64 respectively attached to conductors 55 and 56. Circuit 85 as shown may be connected to drain 51 of FET 30 instead of to a terminal between resistors such as resistors 63 and 64 which are connected respectively to ground and B+ to provide a signal at 81' in response to power supply impairment, the signal being preferably as hereinbefore described.

It will be apparent to those skilled in the art that equivalents may be utilized.

Accordingly, the present invention may be embodied in other specific forms without departing from the spirit or essential attributes thereof, and accordingly, reference should be made to the appended claims rather than to the foregoing specification as indicating the scope of the invention.

It is claimed:

1. In a device for producing a voltage change in an electrical circuit in response to the presence of combustion products in a portion of the device, the combination of:

a radioactive source, said source disposed in an electrically shielded space, said shielded space being the portion of the device wherein the presence of combustion products causes said voltage change to be produced, said shielded space defined by:

an electrically conductive housing member having an aperture to receive a test member and having apertures to admit combustion products to said space, and electrically conductive material in electrical contact with said housing member, a test member of electrically non-conducting material, means to slidably support said test member, said test member provided with engaging means to engage with a spring member, said test member slidably mounted in said support means and received in said aperture in said housing in a normal position wherein a portion of said test member extends into said space, said test member mounted to be slidably moved manually to extend further into said space to produce an impedance change comparable to that produced by the presence of combustion products in said space.

a spring member extending into contact with said engaging means of said test member and biasing said test member toward said normal position and away from extending into said space.

2. The device of claim 1 wherein the distance said test member is moved into said chamber prior to actuation of said device to produce said impedance change tends toward being inversely proportional to the amount of contamination on said radioactive source.

3. The device of claim 1 wherein said spring member is of electrically conductive material and is in electrical contact with an external portion of said housing member to prevent accumulation of excess static charge on said housing member.

4. The device of claim 1 wherein said housing member is formed from a single flat blank.

5. The device of claim 1 wherein said means to slidably support said test member comprise laterally extending resilient finger members and said test member is laterally removable from said finger members and thence longitudinally removable from said aperture in said housing member in which it is received to expose said source through said aperture for inspection and cleaning.

6. The device of claidm 1 wherein said source is a portion of a member which is a flat sheet member except for having an upwardly extending dimple therein and said dimpled source member is retained in a holding member, said holding member having a convexedly upwardly extending central portion acting to provide said dimple in said source member, a portion extending outwardly from said central portion to an upwardly extending wall portion, said wall portion extending inwardly to exert inward and downward force on the periphery of said source member.

7. The device of claim 1 wherein said electrically conductive material which with said housing member defines said shielded space is a layer of metal on a printed circuit board.

8. The device of claim 7 wherein a field effect transistor and two resistors are provided within said shielded space and are disposed in close proximity to said source and to said printed circuit board and the lengths of the leads of said transistor and resistors are minimized.

9. The device of claim 8 wherein said source is mounted in a holder member and said holder member is supported from said printed circuit board by at least one lead extending from at least one of said transistor and said resistors.

10. In a device for producing a voltage change in an electrical circuit in response to the presence of combustion products in a portion of the device, the combination of:

a radioactive source, said source disposed in an electrically shielded space, said shielded space being the portion of the device wherein the presence of combustion products causes said voltage change to be produced, said shielded space defined by:

an electrically conductive housing member having an aperture to receive a test member and having apertures to admit combustion products to said space, and electrically conductive material in electrical contact with said housing member, said electrically conductive material which with said housing member defines said shielded space is a layer of metal on a printed circuit board, a field effect transistor and two resistors are provided within said shielded space and are disposed in close proximity to said source and to said printed circuit board and the lengths of the leads of said transistor and resistors are minimized.

11. The device of claim 10 wherein said housing member is formed from a single flat blank.

12. The device of claim 10 wherein said source is mounted in a holder member and said holder member is supported from said printed circuit board by at least one lead extending from at least one of said transistor and said resistors.

13. the device of claim 10 wherein said source is a portion of a member which is a flat sheet member except for having an upwardly extending dimple therein, and said dimpled source member is retained in a holding member, said holding member having a convexedly upwardly extending central portion acting to provide said dimple in said source member, a portion extending outwardly from said central portion to an upwardly extending wall portion, said wall portion extending inwardly to exert inward and downward force on the periphery of said source member.

* * * * *